(12) United States Patent
Kim

(10) Patent No.: US 11,209,922 B2
(45) Date of Patent: Dec. 28, 2021

(54) DISPLAY APPARATUS

(71) Applicant: SAMSUNG DISPLAY CO., LTD., Yongin (KR)

(72) Inventor: Taeeun Kim, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 2 days.

(21) Appl. No.: 14/659,457

(22) Filed: Mar. 16, 2015

(65) Prior Publication Data

US 2016/0062525 A1 Mar. 3, 2016

(30) Foreign Application Priority Data

Sep. 3, 2014 (KR) .................. 10-2014-0117030

(51) Int. Cl.
*G06F 3/041* (2006.01)
*G02F 1/1333* (2006.01)
*G02F 1/1335* (2006.01)
*G02F 1/1345* (2006.01)

(52) U.S. Cl.
CPC ........ *G06F 3/0412* (2013.01); *G02F 1/13338* (2013.01); *G02F 1/13452* (2013.01); *G02F 1/133308* (2013.01); *G02F 1/133528* (2013.01); *G02F 1/133311* (2021.01); *G02F 1/133331* (2021.01); *G02F 2201/07* (2013.01); *G02F 2201/503* (2013.01); *G02F 2201/56* (2013.01); *G02F 2202/02* (2013.01); *G02F 2202/28* (2013.01)

(58) Field of Classification Search
CPC ............ G06F 3/0412; G02F 2201/503; G02F 1/133528–13355; G09G 3/03–035
See application file for complete search history.

(56) References Cited

U.S. PATENT DOCUMENTS

| | | | | |
|---|---|---|---|---|
| 8,294,869 B2* | 10/2012 | Yamaguchi | ....... | G02F 1/133305 349/158 |
| 8,736,573 B2 | 5/2014 | Byun et al. | | |
| 8,804,347 B2* | 8/2014 | Martisauskas | ........ | G06F 1/1643 361/749 |
| 9,287,329 B1* | 3/2016 | Lee | ..................... | H01L 51/0097 |

(Continued)

FOREIGN PATENT DOCUMENTS

| CN | 101165580 A | 4/2008 |
|---|---|---|
| CN | 102147678 A | 8/2011 |

(Continued)

OTHER PUBLICATIONS

KIPO Office action dated May 30, 2016, for Korean priority Patent application 10-2014-0117030, (5 pages).

(Continued)

*Primary Examiner* — Patrick F Marinelli
(74) *Attorney, Agent, or Firm* — Lewis Roca Rothgerber Christie LLP

(57) ABSTRACT

A display apparatus includes: a display panel including a display device to generate a visible ray; an optical functional layer on a surface of the display panel where a visible ray is generated; a circuit on the display panel such that the circuit overlaps with at least an area of an edge of the display panel; and a reinforcement on a surface of the display panel that faces the optical functional layer, to abut the display panel without overlapping with the circuit.

19 Claims, 8 Drawing Sheets

(56) References Cited

U.S. PATENT DOCUMENTS

| | | | |
|---|---|---|---|
| 9,400,576 B2 | 7/2016 | Chen et al. | |
| 9,466,646 B2* | 10/2016 | Kim | G06F 1/1626 |
| 10,013,912 B2* | 7/2018 | Kim | G09G 3/2003 |
| 2004/0051831 A1* | 3/2004 | Su Yu | G02F 1/13363 |
| | | | 349/117 |
| 2005/0237467 A1 | 10/2005 | Takaishi | |
| 2008/0088765 A1 | 4/2008 | Hashimoto | |
| 2008/0094561 A1* | 4/2008 | Fan | G02F 1/1333 |
| | | | 349/151 |
| 2008/0106874 A1 | 5/2008 | Okuda | |
| 2008/0120946 A1* | 5/2008 | Bayne | B65D 81/05 |
| | | | 53/396 |
| 2008/0246744 A1* | 10/2008 | Park | G06F 3/0416 |
| | | | 345/173 |
| 2009/0096761 A1 | 4/2009 | Cho | |
| 2010/0045705 A1* | 2/2010 | Vertegaal | A47G 19/2227 |
| | | | 345/661 |
| 2010/0117975 A1* | 5/2010 | Cho | G06F 1/165 |
| | | | 345/173 |
| 2010/0327737 A1* | 12/2010 | Hayashi | B60Q 3/745 |
| | | | 313/504 |
| 2011/0122344 A1* | 5/2011 | Matsumura | G02F 1/136286 |
| | | | 349/96 |
| 2011/0141042 A1* | 6/2011 | Kim | G02F 1/13338 |
| | | | 345/173 |
| 2011/0193817 A1* | 8/2011 | Byun | G06F 3/0418 |
| | | | 345/174 |
| 2011/0267320 A1 | 11/2011 | Hu | |
| 2012/0044181 A1* | 2/2012 | Kim | H01L 27/323 |
| | | | 345/173 |
| 2013/0135829 A1 | 5/2013 | Lee | |
| 2013/0201640 A1 | 8/2013 | Kim | |
| 2013/0296000 A1* | 11/2013 | Park | G09G 3/001 |
| | | | 455/566 |
| 2013/0300705 A1* | 11/2013 | Goo | G02F 1/13338 |
| | | | 345/174 |
| 2015/0103053 A1* | 4/2015 | Lin | G06F 3/0412 |
| | | | 345/175 |
| 2016/0062525 A1* | 3/2016 | Kim | G02F 1/133308 |
| | | | 345/173 |
| 2016/0071457 A1* | 3/2016 | Kim | G09G 3/2003 |
| | | | 345/690 |
| 2018/0033833 A1* | 2/2018 | An | G06F 3/0412 |

FOREIGN PATENT DOCUMENTS

| | | |
|---|---|---|
| CN | 202661978 U | 1/2013 |
| CN | 103593080 A | 2/2014 |
| CN | 103748538 A | 4/2014 |
| CN | 103782258 A | 5/2014 |
| KR | 10-2009-0037547 | 4/2009 |
| KR | 10-1216326 B1 | 12/2012 |
| KR | 10-2014-0006251 A | 1/2014 |

OTHER PUBLICATIONS

EPO Search Report dated Jun. 9, 2016, for corresponding European Patent application 15182576.7, (15 pages).

English machine translation of relevant parts of Korean Patent 10-1216326 dated Dec. 27, 2012, listed above, (2 pages).

EPO Search Report dated Feb. 11, 2016, for corresponding European Patent application 15182576.7, (8 pages).

European Patent Office Action for corresponding European Patent Application No. 15 182 576.7, dated Jun. 24, 2019, 4 pages.

* cited by examiner

DISPLAY APPARATUS

CROSS-REFERENCE TO RELATED APPLICATION

This application claims priority to and the benefit of Korean Patent Application No. 10-2014-0117030, filed on Sep. 3, 2014, in the Korean Intellectual Property Office, the disclosure of which is incorporated herein in its entirety by reference.

BACKGROUND

1. Field

One or more embodiments of the present invention relate to a display apparatus.

2. Description of the Related Art

Display apparatuses have recently become more diversely used. In particular, as display apparatuses have become thinner and more light-weight, the range of uses thereof has widened. One type of display apparatus is a self-emissive light emitting display apparatus having an excellent angle of view and an excellent image quality.

A display apparatus includes a display panel that includes a display device that is configured to form an image toward a user's side.

Various components are attached on a display panel of a display apparatus, such as a component used to operate the display panel or a component for improving image quality of images formed on the display panel.

An area of a display panel near an edge of the display apparatus may be deformed, or cracks may be generated in that area due to an external impact.

In particular, when various components are attached to the display panel of the display apparatus, areas other than the area to which the components are attached may be prone to generation of cracks therein or propagation of the cracks.

Accordingly, improvement of durability of the display apparatus may be limited.

SUMMARY

One or more embodiments of the present invention include display apparatuses having an improved durability.

Additional aspects will be set forth in part in the description which follows and, in part, will be apparent from the description, or may be learned by practice of the presented embodiments.

According to one or more embodiments of the present invention, a display apparatus includes: a display panel including a display device; an optical functional layer on a surface of the display panel; a circuit on the surface of the display panel on which the optical functional layer is disposed; and a reinforcement on the display panel without overlapping with the optical functional layer and the circuit.

The reinforcement may not overlap with the optical functional layer.

The reinforcement may be spaced apart from the optical functional layer.

The reinforcement may be spaced apart from the circuit.

The display apparatus may further include a cutting portion in at least an area of an edge of the display panel.

A width of the reinforcement in at least a direction may correspond to a length of the cutting portion or may be greater than the length of the cutting portion.

The cutting portion may be spaced apart from the circuit and the optical functional layer.

The cutting portion may be formed to correspond to corners at two sides of the display panel with the circuit located therebetween.

The reinforcement may include two portions that are respectively formed at the two sides of the display panel with the circuit located therebetween, so as to correspond to the cutting portion.

The reinforcement may have an edge that is parallel to a boundary line of the cutting portion.

The display apparatus may include a bending area, wherein the reinforcement is in the bending area.

The display apparatus may further include a cutting portion in an area of an edge of the display panel, wherein the cutting portion is in the bending area.

The display apparatus may further include a touch panel on the display panel, wherein the reinforcement is between the display panel and the touch panel.

The display apparatus may further include a touch circuit configured to transmit an electrical signal to the touch panel, wherein the reinforcement does not overlap with the touch circuit.

The display apparatus may further include a cover on the display panel, wherein the reinforcement is between the display panel and the cover.

The optical functional layer may include a polarization layer.

The reinforcement may include an organic material.

The reinforcement may include an adhesive material.

The reinforcement may include an adhesive tape.

The display panel may further include a substrate and an encapsulation on the substrate, wherein the display device is between the substrate and the encapsulation, and the reinforcement is on the substrate.

The reinforcement may include the same material as that of the substrate.

The substrate may include a plastic material.

The substrate may include a polyethylene terephthalate (PET).

The reinforcement may include the same material as that of the optical functional layer.

The reinforcement may be formed as a single body with the optical functional layer.

An uppermost surface of the reinforcement may correspond to an uppermost surface of the optical functional layer.

An uppermost surface of the reinforcement may be either higher or lower than an uppermost surface of the optical functional layer.

According to one or more embodiments of the present invention, a display apparatus includes: a display panel including a display device; an optical functional layer on a surface of the display panel; a circuit on the surface of the display panel on which the optical functional layer is disposed; a cover on the optical functional layer; a touch pattern between the display panel and the cover and configured to recognize a touch of a user; and a reinforcement on the display panel without overlapping with the optical functional layer and the circuit.

The reinforcement may overlap with the cover.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
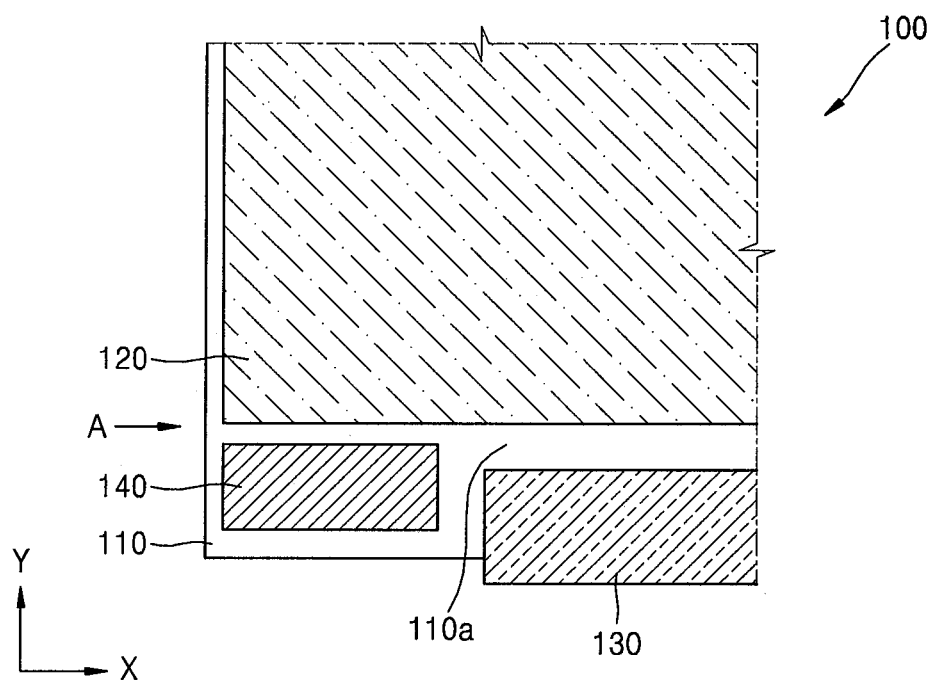
FIG. 1 is a schematic plan view illustrating an area of a display apparatus according to an embodiment of the present invention.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

Since the present invention may have various modifications and several embodiments, exemplary embodiments are shown in the drawings and will be described in detail. Aspects, features, and a method of achieving the same will be specified with reference to the embodiments described below in detail together with the attached drawings. However, the embodiments may have different forms and should not be construed as being limited to the descriptions set forth herein.

It will be understood that although the terms "first", "second", etc. may be used herein to describe various components, these components should not be limited by these terms. These components are only used to distinguish one component from another.

Singular expressions, unless defined otherwise in contexts, include plural expressions.

In the embodiments below, it will be further understood that the terms "comprise," "include," and/or "have" used herein specify the presence of stated features or components, but do not preclude the presence or addition of one or more other features or components.

In the embodiments below, it will be understood when a portion such as a layer, an area, or an element is referred to as being "on" or "above" another portion, it can be directly on or above the other portion, or an intervening portion may also be present. Further, when a first element is described as being "connected" or "coupled" to a second element, the first element may be "directly connected" or "directly coupled" to the second element, or "indirectly connected" or "indirectly coupled" to the second element with one or more other elements interposed therebetween.

Also, in the drawings, for convenience of description, sizes of elements may be exaggerated or contracted. In other words, since sizes and thicknesses of components in the drawings are arbitrarily illustrated for convenience of explanation, the following embodiments are not limited thereto.

In the embodiments below, an x-axis, a y-axis, and a z-axis are not limited to three axes on a rectangular coordinates system but may be construed as including these axes. For example, an x-axis, a y-axis, and a z-axis may be at right angles or may also indicate different directions from one another, which are not at right angles.

When an embodiment is implementable in another manner, a predetermined process order may be different from a described one. For example, two processes that are consecutively described may be concurrently or substantially simultaneously performed or may be performed in an opposite order to the described order.

The embodiments of the present invention will be described below in more detail with reference to the accompanying drawings. Those components that are the same or are in correspondence are rendered the same reference numeral regardless of the figure number, and redundant explanations may be omitted.

Figure 2:
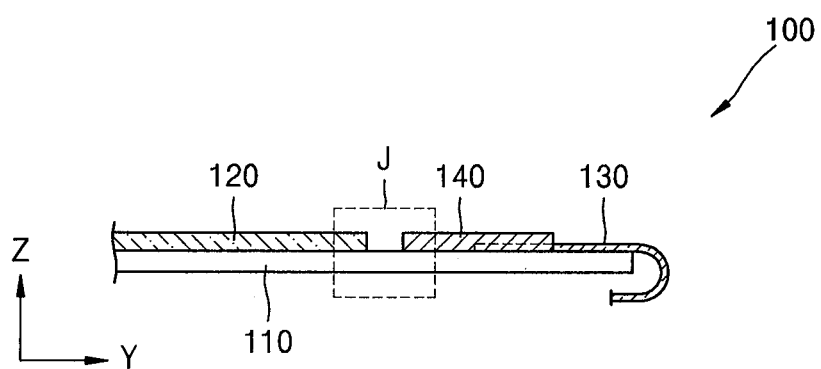
FIG. 2 is a side view of the area of FIG. 1 viewed from a direction A.

FIG. 1 is a schematic plan view illustrating an area of a display apparatus according to an embodiment of the present invention. FIG. 2 is a side view of the area of FIG. 1 viewed from a direction A.

Referring to FIGS. 1 and 2, the display apparatus 100 includes a display panel 110, an optical functional layer 120, a circuit member (or a circuit) 130, and a reinforcement member (or a reinforcement) 140.

The display panel 110 may include one or more display devices to form an image toward a user's side (e.g., to project an image in the direction of the user). For example, the display panel 110 may include a display device such as an organic light emitting device or a liquid crystal display device. The display panel 110 may also include one or more of other various suitable display devices.

The display device of the display panel 110 will be described later with reference to FIGS. 3 and 4.

The optical functional layer 120 is disposed to face a surface of the display panel 10, for example, an upper surface of the display panel 110. In detail, the optical functional layer 120 is disposed such that a visible ray generated within the display panel 110 passes through the optical functional layer 120. The optical functional layer 120 improves image quality characteristics of the display panel 110.

According to an example embodiment, the optical functional layer 120 may be a polarization layer. According to another example embodiment, the optical functional layer 120 may be a film-type polarization layer.

The circuit member 130 is formed to overlap with at least one edge of the display panel 110. The circuit member 130 may transmit an electrical signal used to operate the display panel 110, for example, to operate the display device of the display panel 110, to the display panel 110.

According to an example embodiment, an integrated circuit (IC) (not shown) that applies an electrical signal to the display panel 110 may be formed on a surface of the display panel 110, and the circuit member 130 may be disposed to be electrically connected to the IC. In this case, according to an example embodiment, an end of the circuit member 130 may be connected to a circuit board (not shown) to receive an electrical signal from the circuit board and transmit the electrical signal to the IC or receive an electrical signal from the IC and transmit the electrical signal to the circuit board.

According to an example embodiment, the circuit member 130 may include a flexible material. For example, the circuit member 130 may be a flexible printed circuit (FPC). Alternatively, the circuit member 130 may be a chip-on-film (COF). Alternatively, the circuit member 130 may be a flexible printed circuit board (FPCB).

When the circuit member 130 is flexible, an end of the circuit member 130 may be curved as illustrated in FIG. 2 so that a portion of the circuit member 130 is disposed to face an opposite surface of the display panel 110 to the surface of the display panel 110 facing the optical functional layer 120.

The reinforcement member 140 is disposed on a surface of the display panel 110 facing the optical functional layer 120, that is, on an upper surface of the display panel 110. The display panel 110 includes a first area 110a that is not overlapped with the optical functional layer 120 and the circuit member 130. The first area 110a is an area including at least one edge of the display panel 110.

The reinforcement member 140 is disposed in the first area 110a so as not to overlap with the circuit member 130 and the optical functional layer 120.

According to an example embodiment, the reinforcement member 140 may be spaced apart from the optical functional layer 120 and the circuit member 130.

According to another example embodiment, the reinforcement member 140 may be formed to abut a side surface of the optical functional layer 120 or a side surface of the circuit member 130.

The reinforcement member 140 is formed in the first area 110a, and the first area 110a is an area including an edge of the display panel 110. An edge area of the display panel 110 may be a point (or location) where cracks are generated or propagated if, for example, an external force is applied to the display panel 110. The reinforcement member 140 may be disposed adjacent to an edge of the display panel 110 so as to reduce generation or propagation of cracks or to prevent the same according to circumstances.

The reinforcement member 140 may be formed of one or more of various suitable materials, may be formed of an organic material, and according to an example embodiment, the reinforcement member 140 may be formed of an organic material including an adhesive material.

According to an example embodiment, the reinforcement member 140 may be formed in the form of an adhesive tape and may be attached (e.g., easily attached) to the display panel 110.

According to an example embodiment, the reinforcement member 140 may include the same or substantially the same material as that of the display panel 110.

The reinforcement member 140 may have various thicknesses, and may have a thickness such that steps generated due to the optical functional layer 120 included in the display apparatus 100 may be compensated. For example, an extension line of an uppermost surface of the reinforcement member 140 may correspond to an extension line of an uppermost surface of the optical functional layer 120. In other words, the uppermost surfaces of the optical functional layer 120 and the reinforcement member 140 may be co-planar or substantially co-planar.

According to an example embodiment, the extension line of the uppermost surface of the reinforcement member 140 may be slightly below or slightly above the extension line of the uppermost surface of the optical functional layer 120, such that the uppermost surfaces are close to being co-planar.

The display panel 110 may have various suitable forms, and will be described with reference to FIGS. 3 and 4.

Figure 3:
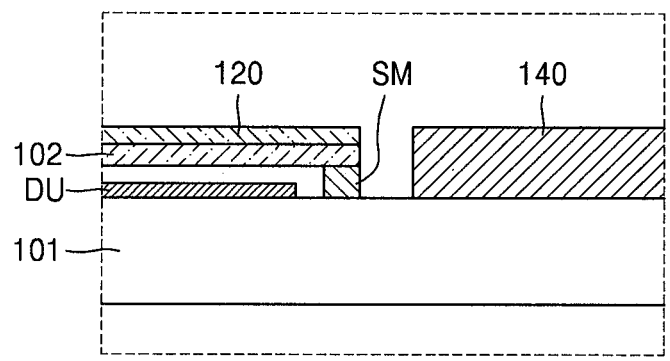
FIG. 3 is an expanded view of a portion J of FIG. 2.
Figure 4:
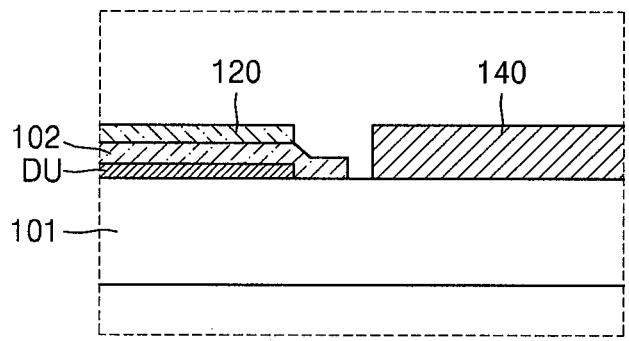
FIG. 4 illustrates a modified example of the portion J of FIG. 3.

FIG. 3 is an expanded view of a portion J of FIG. 2, and FIG. 4 illustrates a modified example of the portion J of FIG. 3.

First, referring to FIG. 3, the display panel 110 includes a substrate 101, an encapsulation member (or an encapsulation) 102, and a display device DU.

The substrate 101 may be formed of one or more of various suitable materials. For example, the substrate 101 may be formed of a glass material including $SiO_2$ as a main component. Also, the substrate 101 may be formed of a flexible material such as a plastic material. Also, according to an example embodiment, the substrate 101 may be formed of a metal.

The encapsulation member 102 is disposed to face the substrate 101. The encapsulation member 102 may also be formed of the same or substantially the same material as that of the substrate 101, for example, a glass material including $SiO_2$ as a main component. Also, the substrate 101 may be formed of a flexible material such as a plastic material.

The display device DU may be disposed between the substrate 101 and the encapsulation member 102. The display device DU may have one or more of various suitable forms to generate a visible ray.

For example, the display device DU may include an organic light emitting device, and the organic light emitting device includes a first electrode, a second electrode, and an intermediate layer disposed between the first and second electrodes.

The intermediate layer includes an organic emissive layer that emits at least a visible ray.

The first electrode (not shown) may function as an anode, and the second electrode (not shown) may function as a cathode, and polarities of the first and second electrodes may also be opposite.

If the first electrode functions as an anode, the first electrode may include ITO, IZO, ZnO, or $In_2O_3$ having a high work function. Also, the first electrode may further include a reflective layer formed of, for example, Ag, Mg, Al, Pt, Pd, Au, Ni, Nd, Ir, Cr, Li, Yb or Ca according to purpose and design conditions.

If the second electrode functions as a cathode, the second electrode may be formed of a metal such as Ag, Mg, Al, Pt, Pd, Au, Ni, Nd, Ir, Cr, Li, or Ca. Also, the second electrode may include ITO, IZO, ZnO, or $In_2O_3$ so that light may transmit therethrough.

The intermediate layer (not shown) includes at least an emissive layer to emit a visible ray. For example, the intermediate layer includes an organic emissive layer and may additionally selectively include one or more of a hole injection layer, a hole transport layer, an electron transport layer, and an electron injection layer.

When a voltage is applied to the first electrode and the second electrode, a visible ray is emitted from the emissive layer of the intermediate layer.

Although not illustrated, the displays panel 110 may include at least one thin film transistor (not shown) that is electrically connected to an organic light emitting device. Also, the display panel 110 may include at least one capacitor that is electrically connected to the organic light emitting device.

According to an example embodiment, a sealing member SM may be disposed to adhere the substrate 101 and the encapsulation member 102. The sealing member SM may be disposed, for example, around the display device DU disposed between the substrate 101 and the encapsulation member 102 to adhere the substrate 101 and the encapsulation member 102 to each other.

The optical functional layer 120 described above may be disposed on an upper surface of the encapsulation member 102. The encapsulation member 102 may not cover an area of a surface of the substrate 101. That is, in the first area 110a of the display panel 110 described above, an area of the substrate 101 may not be covered by the encapsulation member 102 but may be exposed.

The encapsulation member 102 may be smaller than the substrate 101. The reinforcement member 140 may be formed on a surface of the substrate 101. As described above, the reinforcement member 140 may be formed to have an uppermost surface that corresponds to or almost corresponds to an extension line of an uppermost surface of the optical functional layer 120 so as to compensate for a step due to the optical functional layer 120. In other words, the uppermost surfaces of the optical functional layer 120 and the reinforcement member 140 may be co-planar or close to being co-planar. In the described embodiment, a thickness of the reinforcement member 140 may be greater than a thickness of the optical functional layer 120 as illustrated in FIG. 3.

Also, according to an example embodiment, the reinforcement member 140 may be formed not only in an area of the substrate 101 but also in an area of the encapsulation member 102.

Although not illustrated, according to an example embodiment, the first area 110a of the display panel 110 may be an area of the encapsulation member 102. That is, the encapsulation member 102 may have almost the same or substantially the same size as the substrate 101 so that an area of the substrate 101 may not be exposed or may be hardly exposed. In this case, the first area 110a may be an area of an upper surface of the encapsulation member 102 and the reinforcement member 140 may be formed on an upper surface of the encapsulation member 102. When forming the reinforcement member 140, the reinforcement member 140 may be formed of the same or substantially the same material as that of the encapsulation member 102.

Referring to FIG. 4, the encapsulation member 102 may include a thin film or a film-type element. For example, the encapsulation member 102 may include at least one organic layer or at least one inorganic layer. According to another example embodiment, the encapsulation member 102 may have a structure in which at least one organic layer and at least one inorganic layer are alternately stacked at least once.

According to an example embodiment, the encapsulation member 102 may not cover an area of a surface of the substrate 101. That is, an area of a surface of the substrate 101 may not be covered by the encapsulation member 102 but may be exposed. For example, the encapsulation member 102 may be smaller than the substrate 101. That is, in the described embodiment, in the first area 110a of the display panel 110, an area of the substrate 101 may not be covered by the encapsulation member 102 but may be exposed.

Although not illustrated, according to an example embodiment, the first area 110a of the display panel 110 may be an area of the encapsulation member 102. That is, the encapsulation member 102 may have almost the same or substantially the same size as the substrate 101 so that an area of the substrate 101 may not be exposed or may be hardly exposed. In this case, the first area 110a may be an area of an upper surface of the encapsulation member 102 or the reinforcement member 140 may be formed on the upper surface of the encapsulation member 102.

According to an example embodiment, the reinforcement member 140 may include the same or substantially the same material as that of the substrate 101 or the encapsulation member 102. According to an example embodiment, when the substrate 101 is formed of a plastic material having flexibility, for example, when the substrate 101 includes polyethylene terephthalate (PET), the reinforcement member 140 may be formed to include PET. Accordingly, if an external force is applied to the substrate 101, the reinforcement member 140 may effectively buffer a stress applied to the substrate 101 so as to effectively reduce or block generation or propagation of cracks that may be caused to the substrate 101 or the display panel 110 including the substrate 101.

Figure 5:
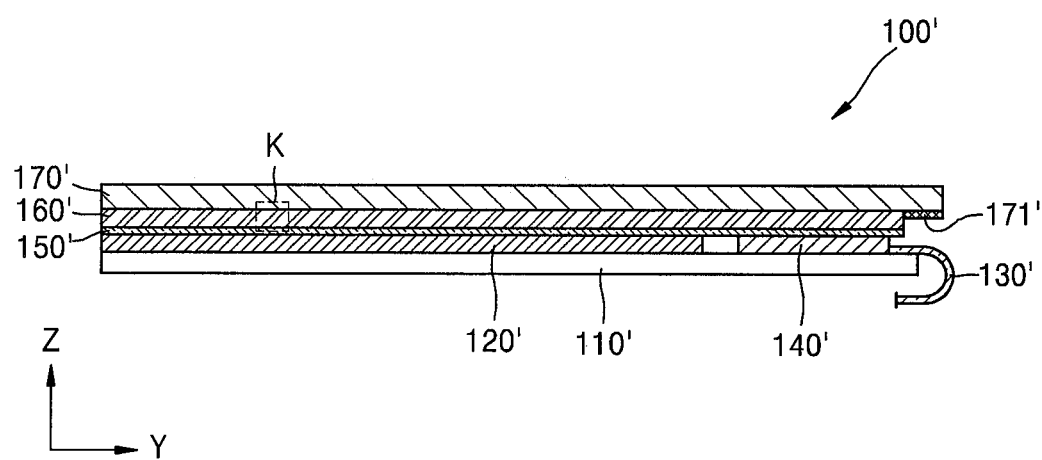
FIG. 5 illustrates a modified example of the area of FIG. 2.

FIG. 5 illustrates a modified example of the area of FIG. 2.

A display apparatus 100' illustrated in FIG. 5 includes a display panel 110', an optical functional layer 120', a circuit member (or a circuit) 130', a reinforcement member (or a reinforcement) 140', a touch panel 160', and a cover member (or a cover) 170'. For convenience of description, description will focus on differences from the above-described embodiment.

The display panel 110', the optical functional layer 120', the circuit member 130', and the reinforcement member 140' are the same or substantially the same as those described in the above-described embodiment, and thus detailed description thereof will be omitted.

The touch panel 160' is disposed on the optical functional layer 120'. The touch panel 160' may include at least one touch pattern so as to recognize a touch of a user, and this will be described later with reference to FIGS. 6 and 7.

According to an example embodiment, an adhesion member 150' may be disposed between the touch panel 160' and the optical functional layer 120', and the adhesion member 150' may be formed such that at least a portion of light generated within the display panel 110' is transmitted through the adhesion member 150'.

The cover member 170' is disposed on the touch panel 160'. Accordingly, the touch panel 160' is disposed between the cover member 170' and the display panel 110' or between the cover member 170' and the optical functional layer 120'. According to an example embodiment, according to circumstances, the cover member 170' may be omitted. Also, the touch panel 160' may be omitted and the cover member 170' may be disposed on the display panel 110'.

The cover member 170' prevents or reduces damages due to an impact applied to the display panel 110' or the touch panel 160', thereby improving durability of the display panel 110'. The cover member 170' may be formed of one or more of various suitable materials, for example, of a glass material or a plastic material. According to an example embodiment, when light generated within the display panel 110' is transmitted to the user's side through the cover member 170', the cover member 170' may be formed of a light-transmissive material.

According to an example embodiment, an adhesive material (not shown) may be disposed between the cover member 170' and the display panel 110'.

Meanwhile, according to an example embodiment, a light blocking layer 171' may be formed in an area of the cover member 170' that is not covered by the touch panel 160'.

The reinforcement member 140' may be disposed to correspond to space between the display panel 110' and the touch panel 160'. Accordingly, an area of the display panel 110' corresponding to the space between the touch panel 160' and the display panel 110' may be prevented or substantially prevented from being damaged due to an external force, or generation or propagation of cracks due to an external force may be effectively reduced, blocked, or substantially blocked.

According to an example embodiment, if a size of the touch panel 160' is reduced, the reinforcement member 140' may be disposed to correspond to space between the display panel 110' and the cover member 170'. Accordingly, an area of the display panel 110' corresponding to the space between the cover member 170' and the display panel 110' may be prevented or substantially prevented from being damaged due to an external force, or generation or propagation of cracks due to an external force may be effectively reduced, blocked, or substantially blocked.

Figure 6:
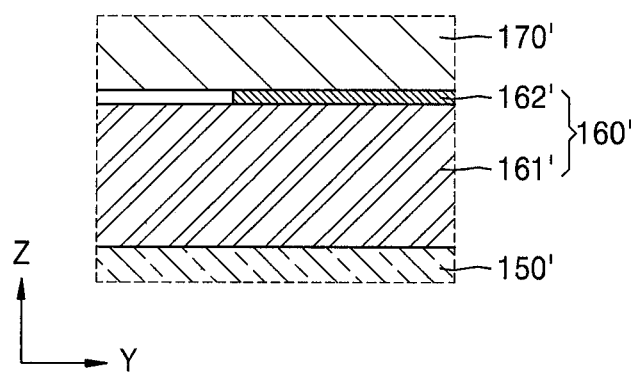
FIG. 6 is an expanded view of a portion K of FIG. 5.
Figure 7:
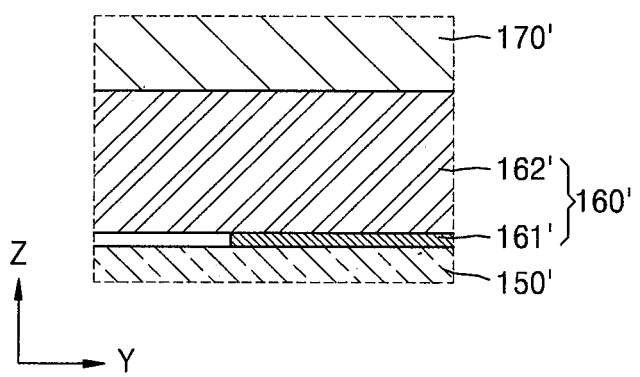
FIG. 7 illustrates a modified example of the portion K of FIG. 6.

FIG. 6 is an expanded view of a portion K of FIG. 5, and FIG. 7 illustrates a modified example of the portion K of FIG. 6.

The touch panel 160' may have one or more of various suitable forms. Referring to FIG. 6, the touch panel 160' includes a base member 161' and a touch pattern 162'. The touch pattern 162' may be formed on an upper surface of the base member 161'. That is, the touch pattern 162' may be formed on a surface of the base member 161' facing the cover member 170'.

Also, alternatively, as illustrated in FIG. 7, the touch pattern 162' may be formed on a lower surface of the base member 161', that is, on a surface of the base member 161' facing the display panel 110'.

Also, the touch pattern 162' may have one or more of various suitable forms. That is, the touch pattern 162' may include a single conductive pattern or a plurality of conductive pattern layers, or may include two or more conductive pattern layers with at least one insulation layer included (or located) therebetween.

Also, according to an example embodiment, instead of including an additional touch panel, the touch pattern 162' may be formed at least on a surface of an encapsulation member (or an encapsulation).

Figure 8:
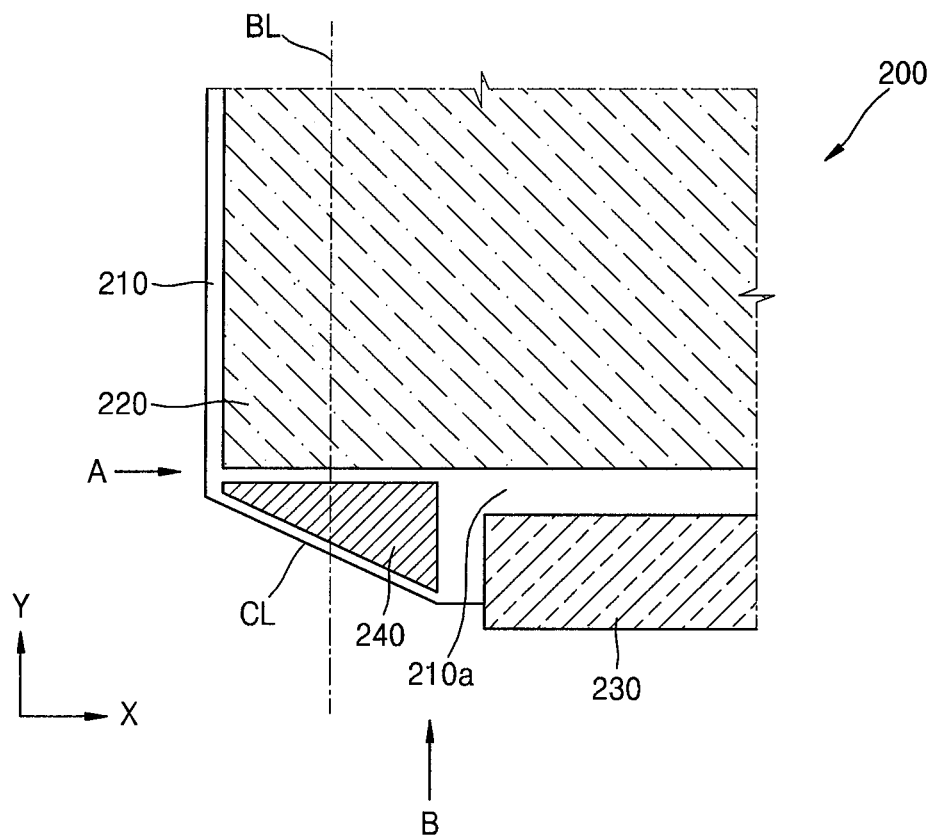
FIG. 8 is a schematic plan view illustrating an area of a display apparatus according to another embodiment of the present invention.

FIG. 8 is a schematic plan view illustrating an area of a display apparatus 200 according to another embodiment of the present invention. Referring to FIG. 8, the display apparatus 200 includes a display panel 210, an optical functional layer 220, a circuit member (or a circuit) 230, and a reinforcement member (or a reinforcement) 240.

The display apparatus 200 may be bent with respect to a bending axis BL. Alternatively, the display apparatus 200 may be maintained in a bent state with respect to the bending axis BL.

Accordingly, the display apparatus 200 includes a bending area with respect to the bending axis BL.

The display panel 210 may include at least one display device to form an image toward a user's side. For example, the display panel 210 may include a display device such as an organic light emitting device or a liquid crystal display device. The display panel 210 may also include one or more of other various suitable display devices.

The optical functional layer 220 is disposed to face a surface of the display panel 210, for example, an upper surface of the display panel 210. In detail, the optical functional layer 220 is disposed such that a visible ray generated within the display panel 210 passes through the optical functional layer 220. The optical functional layer 220 improves image quality characteristics of the display panel 210.

According to an example embodiment, the optical functional layer 220 may be a polarization layer. According to another example embodiment, the optical functional layer 220 may be a film-type polarization layer.

The circuit member 230 is formed to overlap with at least one edge of the display panel 210. The circuit member 230 may transmit an electrical signal used to operate the display panel 210, for example, to operate the display device of the display panel 210, to the display panel 210.

According to an example embodiment, an integrated circuit (IC) (not shown) that applies an electrical signal to the display panel 210 may be formed on a surface of the display panel 210, and the circuit member 230 may be disposed to be electrically connected to the IC. In this case, according to an example embodiment, an end of the circuit member 230 may be connected to a circuit board (not shown) to receive an electrical signal from the circuit board and transmit the electrical signal to the IC or receive an electrical signal from the IC and transmit the electrical signal to the circuit board.

According to an example embodiment, the circuit member 230 may include a flexible material. For example, the circuit member 230 may be an FPC. Alternatively, the circuit member 230 may be an FPCB. Alternatively, the circuit member 230 may be a chip-on-film (COF).

Figure 9:
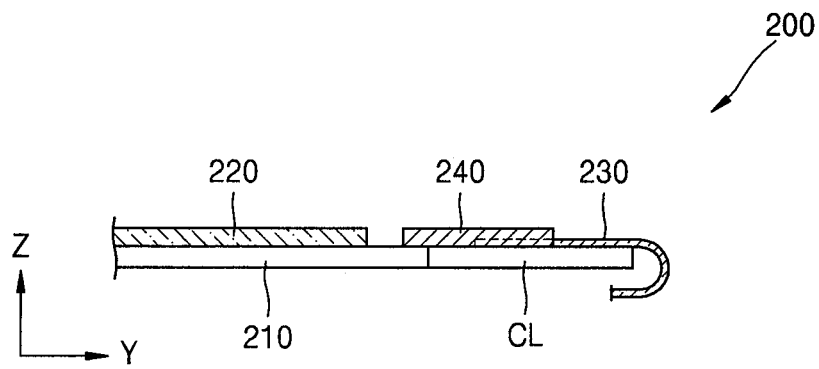
FIG. 9 is a side view of the area of FIG. 8 viewed from a direction A.

When the circuit member 230 is flexible, an end of the circuit member 230 may be curved as illustrated in FIG. 9 so that a portion of the circuit member 230 is disposed to face an opposite surface to the surface of the display panel 210 facing the optical functional layer 220.

The reinforcement member 240 is disposed on a surface of the display panel 210 facing the optical functional layer 220, that is, on an upper surface of the display panel 210. The display panel 210 includes a first area 210a that is not overlapped with the optical functional layer 220 and the circuit member 230. The first area 210a is an area including at least one edge of the display panel 210.

The display panel 210 includes a cutting portion CL in at least an area of an edge thereof. The cutting portion CL is an area where a cutting process is performed when forming the display panel 210, and when manufacturing the display apparatus 200 by using the display panel 210, the cutting portion CL improves space utilization efficiency for disposing other elements (not shown) of the display panel apparatus 200.

The cutting portion CL may be formed at various positions. According to an example embodiment, the cutting portion CL may be formed in a corner area of an edge area of the display panel 210, that is, in an area where two edges of the display panel 210 meet each other.

The display panel 210 may include a substrate (not shown) and an encapsulation member (or an encapsulation, not shown) as described above, and the cutting portion CL may be formed on the substrate. According to an example embodiment, the cutting portion CL may be formed on the encapsulation member.

According to an example embodiment, the cutting portion CL may be overlapped with the bending axis BL.

Also, according to an example embodiment, the cutting portion CL is included in the first area 210a. That is, the cutting portion CL may be formed in an area that is not overlapped with the optical functional layer 220 and the circuit member 230.

The reinforcement member 240 may be disposed in the first area 210a so as not to be overlapped with the circuit member 230 and the optical functional layer 220.

According to an example embodiment, the reinforcement member 240 may be spaced apart from the optical functional layer 220 and the circuit member 230.

According to another example embodiment, the reinforcement member 240 may be formed to abut a side surface of the optical functional layer 220 or a side surface of the circuit member 230.

Also, the reinforcement member 240 may overlap with the bending axis BL.

The reinforcement member 240 is formed in the first area 210a, and the first area 210a is an area including an edge of the display panel 210. An edge area of the display panel 210 may be a point where cracks are generated or propagated if, for example, an external force is applied to the display panel 210. The reinforcement member 240 is disposed adjacent to the edge of the display panel 210 so as to reduce generation or propagation of cracks, or to prevent or substantially prevent the same according to circumstances.

Also, the reinforcement member 240 may be disposed adjacent to the cutting portion CL as much as possible. Also, according to an example embodiment, a width of the reinforcement member 240 in at least a direction may correspond to or be greater than a length of the cutting portion CL.

The cutting portion CL is an area among edge areas of the display panel 210 where high stresses are generated due to an external force, and thus cracks are more likely to be generated. The reinforcement member 240 may effectively support the cutting portion CL and mitigate stresses in the cutting portion CL, thereby reducing generation or propagation of cracks or preventing or substantially preventing the same according to circumstances.

According to an example embodiment, the reinforcement member 240 may be formed to have a parallel edge to a boundary line of the cutting portion CL.

Figure 10A:
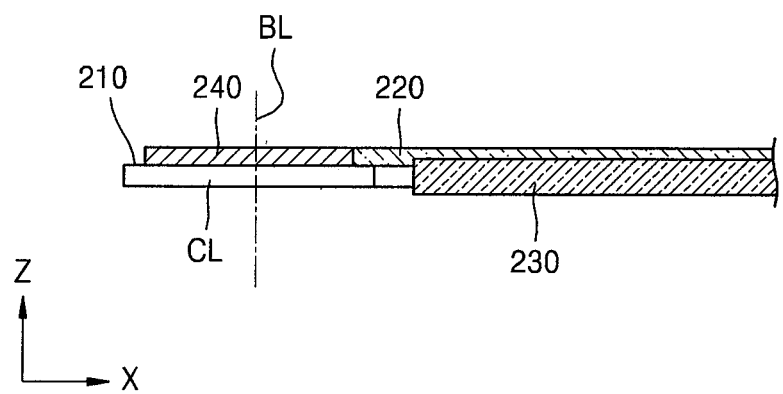
FIGS. 10A and 10B are side views of the area viewed from a direction B of FIG. 8.
Figure 10B:
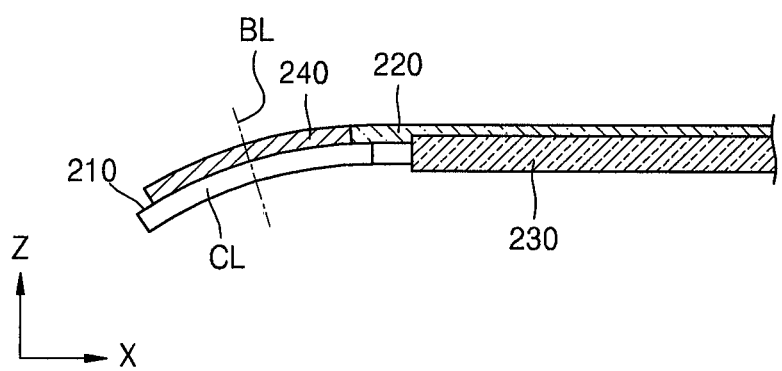

Meanwhile, the display apparatus 200 according to the present embodiment may have a planar shape as illustrated in FIG. 10A, but may also have a bent (or curved) shape as illustrated in FIG. 10B. Here, the display apparatus 200 may maintain a bent (or curved) shape or may have a bent (or curved) shape only when desired according to user's convenience.

According to an example embodiment, the display apparatus 200 may include at least one bending axis BL. The bending axis BL may overlap with the cutting portion CL.

When the display apparatus 200 is bent with respect to the bending axis BL, a considerable amount of stress is applied to the cutting portion CL. Accordingly, cracks are (or may be) generated in the cutting portion CL, and the cracks may propagate through the entire area of the display panel 210. The reinforcement member 240 may effectively mitigate stress applied to the cutting portion CL even if the display apparatus 200 is bent with respect to the bending axis BL, thereby reducing generation and propagation of the cracks.

That is, the reinforcement member 240 may overlap with the bending axis BL, and is formed in an area of a bending area, accordingly.

In particular, as in a modified example to be described later, when a touch panel or a cover member or the like is attached on the display panel 210, stress generated in the cutting portion CL increases due to a difference in physical characteristics with respect to the display panel 210, and the stress may further increase due to a step formed due to the optical functional layer 220. However, the reinforcement member 240 may reduce the step formed due to the optical functional layer 220, thereby reducing the stress in the cutting portion CL and effectively reducing, substantially preventing, or preventing generation or propagation of cracks.

The reinforcement member 240 may be formed of one or more of various suitable materials, for example, an organic material. According to an example embodiment, the reinforcement member 240 may be formed of an organic material including an adhesive material.

According to an example embodiment, the reinforcement member 240 may be formed in the form of an adhesive tape and may be attached (e.g., easily attached) to the display panel 210.

According to an example embodiment, the reinforcement member 240 may include the same or substantially the same material as that of the display panel 210.

The reinforcement member 240 may have various thicknesses, and may have a thickness such that steps generated due to the optical functional layer 220 included in the display apparatus 200 may be compensated. For example, an extension line of an uppermost surface of the reinforcement member 240 may correspond to an extension line of an uppermost surface of the optical functional layer 220, such that the uppermost surfaces of the optical functional layer 220 and the reinforcement member 240 may be co-planar or substantially co-planar with each other.

According to an example embodiment, the extension line of the uppermost surface of the reinforcement member 240 may be slightly below or slightly above the extension line of the uppermost surface of the optical functional layer 220, such that the uppermost surfaces of the optical functional layer 220 and the reinforcement member 240 may be close to being co-planar.

Although not illustrated, the display panel 210 in some embodiments may selectively include a structure of FIGS. 3 and 4 described above.

Figure 11:
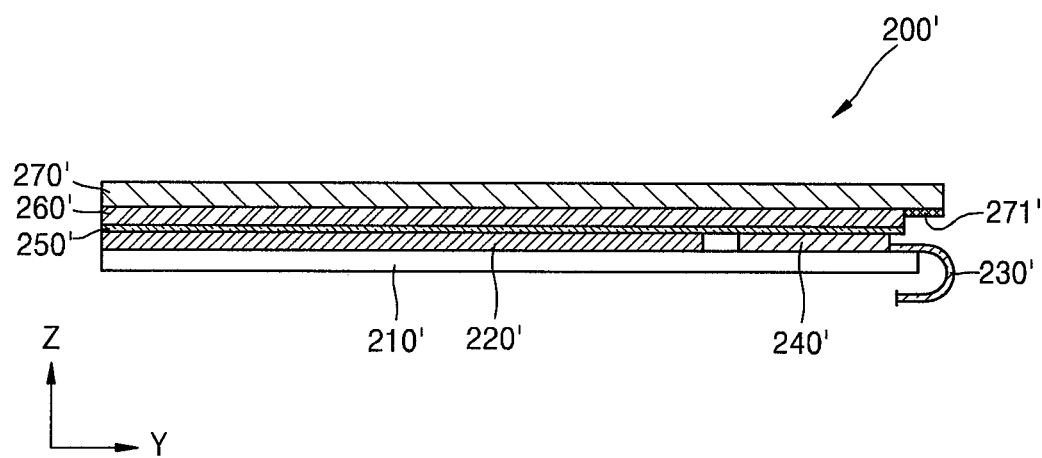
FIG. 11 illustrates a modified example of the area of FIG. 9.

FIG. 11 illustrates a modified example of the area of FIG. 9.

A display apparatus 200' illustrated in FIG. 11 includes a display panel 210', an optical functional layer 220', a circuit member (or a circuit) 230', a reinforcement member (or a reinforcement) 240', a touch panel 260', and a cover member (or a cover) 270'. For convenience of description, description will focus on differences from the above-described embodiment.

The display panel 210', the optical functional layer 220', the circuit member 230', and the reinforcement member 240', are the same or substantially the same as those described in the above-described embodiment of FIG. 9, and thus detailed description thereof will be omitted.

The touch panel 260' is disposed on the optical functional layer 220'. The touch panel 260' may include at least one touch pattern to recognize a touch of a user, and the structure of the touch panel 260' is the same or substantially the same as that described with reference to FIGS. 6 and 7.

According to an example embodiment, an adhesion member 250' may be disposed between the touch panel 260' and the optical functional layer 220', and the adhesion member 250' may be formed such that at least a portion of light generated within the display panel 210' is transmitted through the adhesion member 250'.

The cover member 270' is disposed on the touch panel 260'. Accordingly, the touch panel 260' is disposed between the cover member 270' and the display panel 210' or between the cover member 270' and the optical functional layer 220'. According to an example embodiment, according to circumstances, the cover member 270' may be omitted. Also, the touch panel 260' may be omitted and the cover member 270' may be disposed on the display panel 210'.

The cover member 270' prevents or substantially prevents damages due to an impact applied to the display panel 210' or the touch panel 260', thereby improving durability of the display panel 210'. The cover member 270' may be formed of one or more of various suitable materials, for example, of a glass material or a plastic material. According to an example embodiment, when light generated within the display panel 210' is transmitted to the user's side through the cover member 270', the cover member 270' may be formed of a light-transmissive material.

According to an example embodiment, an adhesive material (not shown) may be disposed between the cover member 270' and the display panel 210'.

Meanwhile, according to an example embodiment, a light blocking layer 271' may be formed in an area of the cover member 270' that is not covered by the touch panel 260'.

The reinforcement member 240' may be disposed to correspond to space between the display panel 210' and the touch panel 260'. Accordingly, an area of the display panel 210' corresponding to the space between the touch panel 260' and the display panel 210' may be prevented or substantially prevented from being damaged due to an external force, or generation or propagation of cracks due to an external force may be effectively reduced, substantially blocked, or blocked.

According to an example embodiment, if a size of the touch panel 260' is reduced, the reinforcement member 240' may be disposed to correspond to space between the display panel 210' and the cover member 270'. Accordingly, an area of the display panel 210' corresponding to the space between the cover member 270' and the display panel 210' may be prevented or substantially prevented from being damaged due to an external force, or generation or propagation of cracks due to an external force may be effectively reduced, substantially blocked, or blocked.

According to an example embodiment, the touch panel 260' may selectively include the structure illustrated in FIGS. 6 and 7.

That is, the touch panel 260' may include a base member (not shown) and a touch pattern (not shown), and the touch pattern may be formed on an upper surface or a lower surface of the base member.

Figure 12:
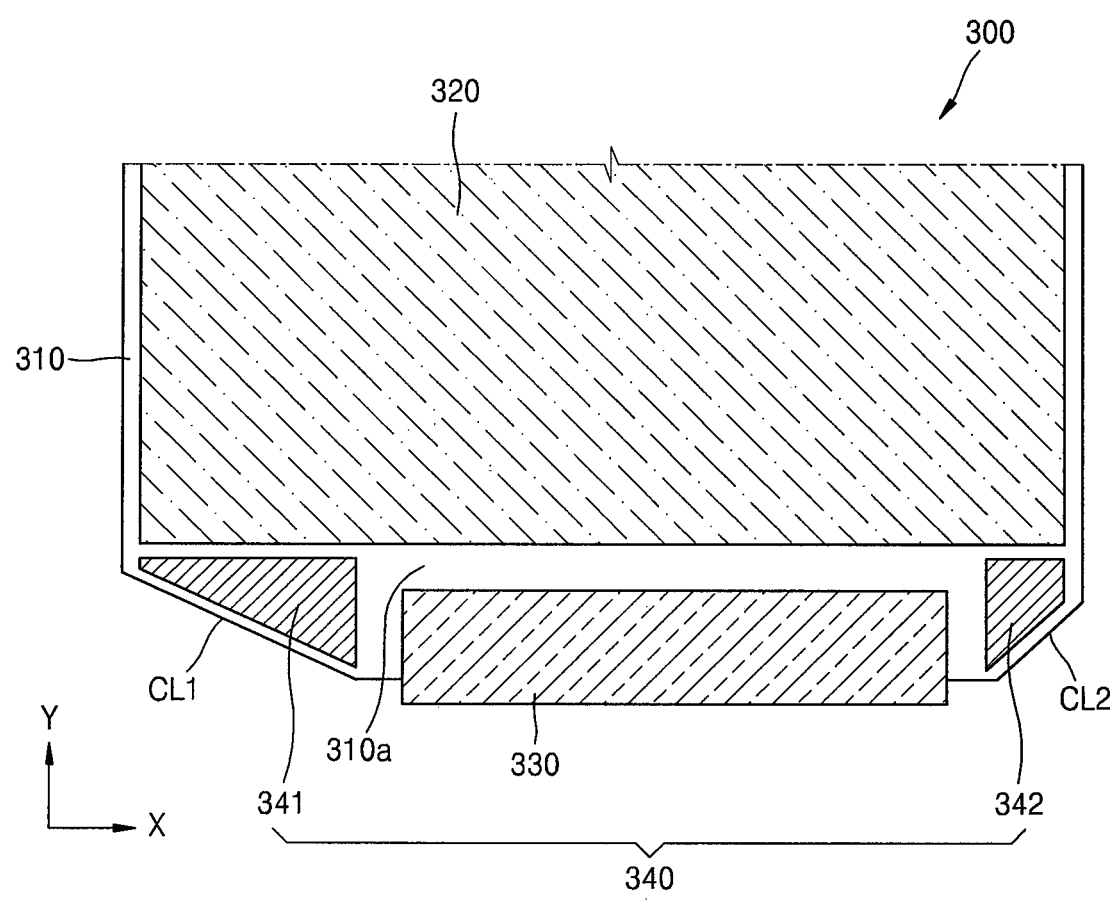
FIG. 12 is a schematic plan view illustrating an area of a display apparatus according to another embodiment of the present invention.

FIG. 12 is a schematic plan view illustrating an area of a display apparatus 300 according to another embodiment of the present invention.

Referring to FIG. 12, the display apparatus 300 includes a display panel 310, an optical functional layer 320, a circuit member (or a circuit) 330, and a reinforcement member (or a reinforcement) 340.

For convenience of description, description will focus on differences from the above-described embodiments.

Although not illustrated, according to an example embodiment, the display apparatus 300 may be bent with respect to a bending axis (not shown). Alternatively, the display apparatus 300 may be maintained in a bent state with respect to a bending axis (not shown). According to an example embodiment, the display apparatus 300 may be bent with respect to two bending axes (not shown), and may include cutting portions CL1 and CL2 that overlap with a bending axis (not shown).

The display panel 310 may include at least one display device to form an image toward a user's side. For example, the display panel 310 may include a display device such as an organic light emitting device or a liquid crystal display device. The display panel 310 may also include one or more of other various suitable display devices.

The optical functional layer 320 is disposed to face a surface of the display panel 310, for example, an upper surface of the display panel 310. In detail, the optical functional layer 320 is disposed such that a visible ray generated within the display panel 310 passes through the optical functional layer 320. The optical functional layer 320 improves image quality characteristics of the display panel 310.

According to an example embodiment, the optical functional layer 320 may be a polarization layer. According to another example embodiment, the optical functional layer 320 may be a film-type polarization layer.

The circuit member 330 is formed to overlap with at least one edge of the display panel 310. The circuit member 330 may transmit an electrical signal used to operate the display panel 310, for example, to operate the display device of the display panel 310, to the display panel 310.

According to an example embodiment, an integrated circuit (IC) (not shown) that applies an electrical signal to the display panel 310 may be formed on a surface of the display panel 310, and the circuit member 330 may be disposed to be electrically connected to the IC. In this case, according to an example embodiment, an end of the circuit member 330 may be connected to a circuit board (not shown) to receive an electrical signal from the circuit board and transmit the electrical signal to the IC or receive an electrical signal from the IC and transmit the electrical signal to the circuit board.

According to an example embodiment, the circuit member 330 may include a flexible material. For example, the circuit member 330 may be an FPC. Alternatively, the circuit member 330 may be an FPCB. Alternatively, the circuit member 330 may be a chip-on-film (COF).

The reinforcement member 340 is disposed on a surface of the display panel 310 facing the optical functional layer 320, that is, on an upper surface of the display panel 310. The reinforcement member 340 includes a first reinforcement member (or a first reinforcement) 341 and a second reinforcement member (or a second reinforcement) 342.

The display panel 310 includes a first area 310a that is not overlapped with the optical functional layer 320 and the circuit member 330. The first area 310a is an area including at least one edge of the display panel 310. The first reinforcement member 341 and the second reinforcement member 342 of the reinforcement member 340 are disposed in the first area 310a at two sides with the circuit member 330 included (or located) therebetween.

The display panel 310 includes first and second cutting portions CL1 and CL2 in at least two areas of an edge thereof. The first cutting portion CL1 and the second cutting portion CL2 are spaced apart from each other and may be formed at two sides with the circuit member 330 included (or located) therebetween.

The first and second cutting portions CL1 and CL2 are areas where a cutting process is performed when forming the display panel 310, and when manufacturing the display apparatus 300 by using the display panel 310. The first and second cutting portions CL1 and CL2 improve space utilization efficiency for disposing other elements (not shown) of the display apparatus 300.

As described above, the display panel 310 may also include a substrate (not shown) and an encapsulation member (or an encapsulation, not shown), and the first cutting portion CL1 and the second cutting portion CL2 may be formed on the substrate. According to an example embodiment, the first cutting portion CL1 and the second cutting portion CL2 may be formed on the encapsulation member.

According to an example embodiment, the first cutting portion CL1 and the second cutting portion CL2 may be formed at two corners of an edge area of the display panel 310. According to an example embodiment, the first cutting portion CL1 and the second cutting portion CL2 may overlap with a bending axis (not shown).

Also, according to an example embodiment, the first cutting portion CL1 and the second cutting portion CL2 are included in the first area 310a. That is, the first cutting portion CL1 and the second cutting portion CL2 may be formed in an area that is not overlapped with the optical functional layer 320 and the circuit member 330.

The first reinforcement member 341 and the second reinforcement member 342 of the reinforcement member 340 are disposed in the first area 310a and thus do not overlap with the circuit member 330 and the optical functional layer 320.

According to an example embodiment, the reinforcement member 340 may be spaced apart from the optical functional layer 320 and the circuit member 330.

According to another example embodiment, the reinforcement member 340 may be formed to abut a side surface of the optical functional layer 320 or a side surface of the circuit member 330.

The reinforcement member 340 is formed in the first area 310a, and the first area 310a is an area including an edge of the display panel 310. An edge area of the display panel 310 may be a point where cracks are generated or propagated if, for example, an external force is applied to the display panel 310. The reinforcement member 340 is disposed adjacent to an edge of the display panel 310 so as to reduce generation or propagation of cracks or prevent or substantially prevent the same according to circumstances.

Also, the reinforcement member 340 may be disposed adjacent to the first and second cutting portions CL1 and CL2 as much as possible. That is, the first reinforcement member 341 may be disposed adjacent to the first cutting portion CL1, and according to an example embodiment, a width of the first reinforcement member 341 in at least a direction may correspond to a length of the first cutting portion CL1.

Also, the second reinforcement member 342 may be disposed adjacent to the second cutting portion CL2, and according to an example embodiment, a width of the second reinforcement member 342 in at least a direction may correspond to a length of the second cutting portion CL2.

According to an example embodiment, the first reinforcement member 341 may be formed to have a parallel edge to a boundary line of the first cutting portion CL1, and the second reinforcement member 342 may be formed to have a parallel edge to a boundary line of the second cutting portion CL2.

Meanwhile, the display apparatus 300 according to the present embodiment may have a planar shape or a bent (or curved) shape as illustrated in FIG. 10A and in FIG. 10B.

The reinforcement member 340 may be formed of one or more of various suitable materials, for example, an organic material. According to an example embodiment, the reinforcement member 340 may be formed of an organic material including an adhesive material.

According to an example embodiment, the reinforcement member 340 may be formed in the form of an adhesive tape and may be attached (e.g., easily attached) to the display panel 310.

According to an example embodiment, the reinforcement member 340 may include the same or substantially the same material as that of the display panel 310.

The reinforcement member 340 may have various thicknesses, and may have a thickness such that steps generated due to the optical functional layer 320 included in the display apparatus 300 may be compensated. For example, an extension line of an uppermost surface of the reinforcement member 340 may correspond to an extension line of an uppermost surface of the optical functional layer 320, such that the uppermost surfaces of the optical functional layer 320 and the reinforcement member 340 may be co-planar or substantially co-planar.

According to an example embodiment, the extension line of the uppermost surface of the reinforcement member 340 may be slightly below or slightly above the extension line of the uppermost surface of the optical functional layer 320, such that the uppermost surfaces of the optical functional layer 320 and the reinforcement member 340 may be close to being co-planar.

Although not illustrated, the display panel 310 in some embodiments may selectively include the structure of FIGS. 3 and 4 described above.

Also, although not illustrated, according to an example embodiment, the display apparatus 300 according to the present embodiment may include a touch panel (not shown) or a cover member (or cover, not shown) as illustrated in FIG. 11.

The touch panel included in the display apparatus 300 has the same or substantially the same structure as that of FIGS. 6 and 7 described above.

Figure 13:
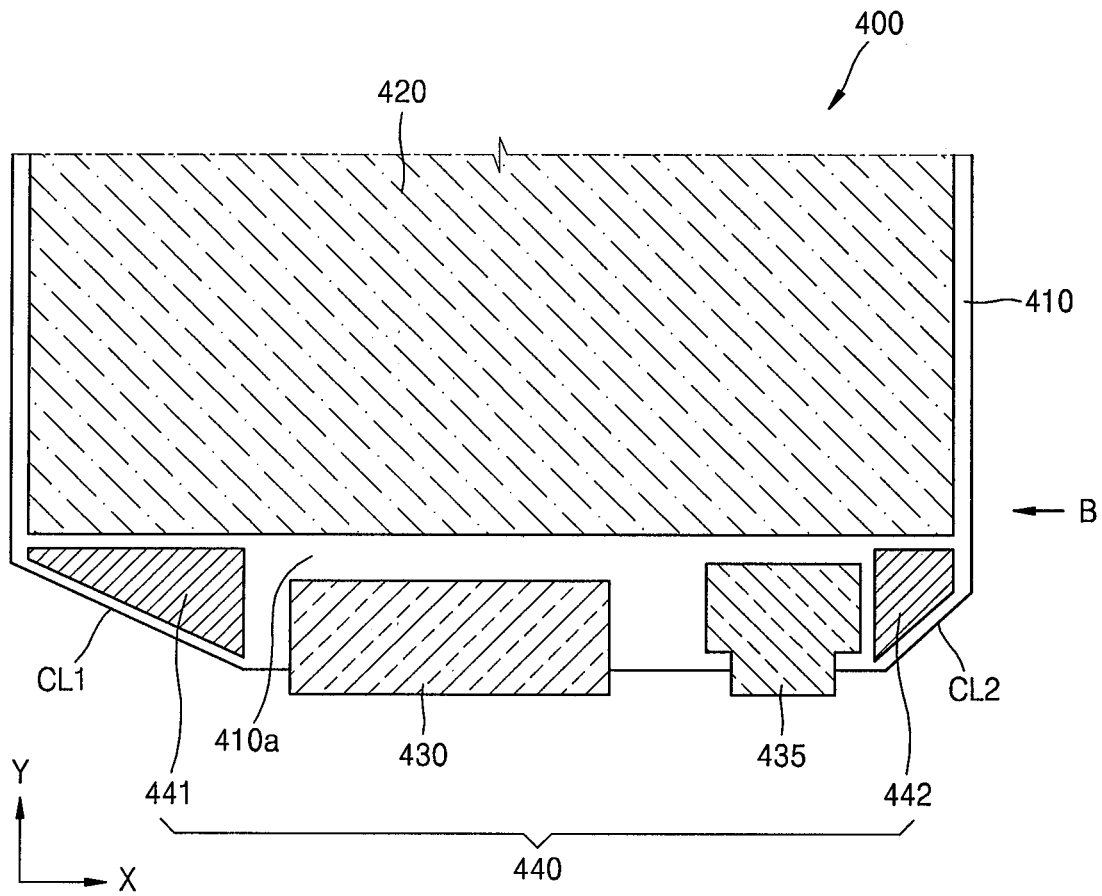
FIG. 13 is a schematic plan view illustrating an area of a display apparatus according to another embodiment of the present invention.
Figure 14:
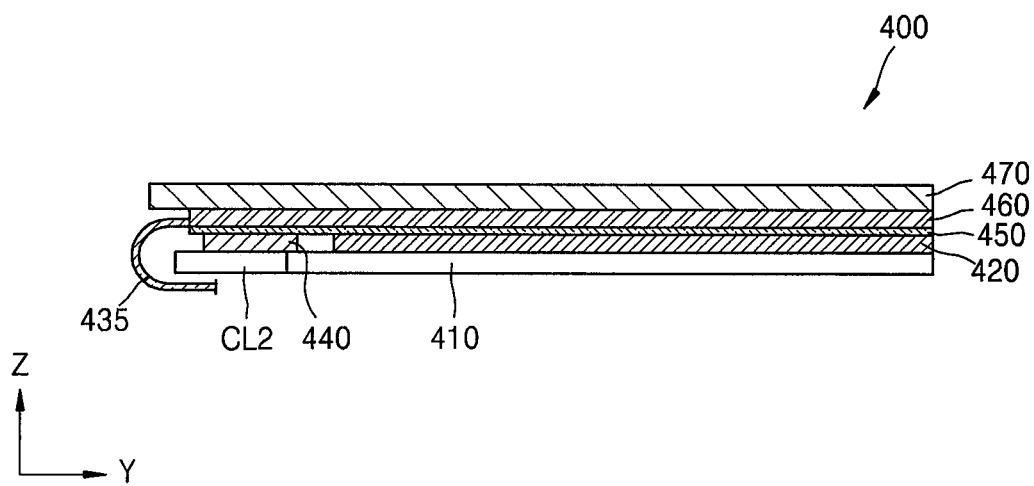
FIG. 14 is a side view of the area of FIG. 13 viewed from a direction B.

FIG. 13 is a schematic plan view illustrating an area of a display apparatus 400 according to another embodiment of the present invention, and FIG. 14 is a side view of the area of FIG. 13 viewed from a direction B.

Referring to FIGS. 13 and 14, the display apparatus 400 includes a display panel 410, an optical functional layer 420, a reinforcement member (or a reinforcement) 440, a touch panel 460, and a touch circuit member (or a touch circuit) 435 for transmitting a signal to the touch panel 460. For convenience of description, description will focus on differences from the previous embodiment.

Although not illustrated, according to an example embodiment, the display apparatus 400 may be bent with respect to a bending axis (not shown). Alternatively, the display apparatus 400 may be maintained in a bent state with respect to a bending axis (not shown). According to an example embodiment, the display apparatus 400 may be bent with respect to two bending axes (not shown), and may include cutting portions CL1 and CL2 that overlap with a bending axis (not shown).

The display panel 410 may include at least one display device to form an image toward a users side. For example, the display panel 410 may include a display device such as an organic light emitting device or a liquid crystal display device. The display panel 410 may also include one or more of other various suitable display devices.

The optical functional layer 420 is disposed to face a surface of the display panel 410, for example, an upper surface of the display panel 410. In detail, the optical functional layer 420 is disposed such that a visible ray generated within the display panel 410 passes through the optical functional layer 420. The optical functional layer 420 improves image quality characteristics of the display panel 410.

According to an example embodiment, the optical functional layer 420 may be a polarization layer. Alternatively, the optical functional layer 420 may be a film-type polarization layer.

The circuit member 430 is formed to overlap with at least one edge of the display panel 410. The circuit member 430 may transmit an electrical signal used to operate the display panel 410, for example, to operate the display device of the display panel 410, to the display panel 410.

According to an example embodiment, an integrated circuit (IC) (not shown) that applies an electrical signal to the display panel 410 may be formed on a surface of the display panel 410, and the circuit member 430 may be disposed to be electrically connected to the IC. In this case, according to an example embodiment, an end of the circuit member 430 may be connected to a circuit board (not shown) to receive an electrical signal from the circuit board and transmit the electrical signal to the IC or receive an electrical signal from the IC and transmit the electrical signal to the circuit board.

According to an example embodiment, the circuit member 430 may include a flexible material. For example, the circuit member 430 may be an FPC. Alternatively, the circuit member 430 may be an FPCB. Alternatively, the circuit member 430 may be a chip-on-film (COF).

The touch panel 460 is disposed on the optical functional layer 420. The touch panel 460 may include at least one touch pattern to recognize a touch of a user, and an example of the touch panel 460 is the same or substantially the same as that illustrated in FIGS. 6 and 7.

According to a an example embodiment, an adhesion member 450 may be disposed between the touch panel 460 and the optical functional layer 420, and the adhesion member 450 may be formed such that at least a portion of light generated within the display panel 410 is transmitted through the adhesion member 450.

The touch circuit member 435 is formed to transmit an electrical signal to the touch panel 460: According to an exemplary embodiment, the touch circuit member 435 may transmit an electrical signal to the touch panel 460.

The touch circuit member 435 may be electrically connected to the touch panel 460 via a wiring (not shown) or a conductive pattern (not shown).

The touch circuit member 435 may have various suitable forms and/or of various suitable types. According to an example embodiment, the touch circuit member 435 may include a flexible material. For example, the touch circuit member 435 may be an FPC. Alternatively, the touch circuit member 435 may be an FPCB.

An end of the touch circuit member 435 which is flexible may be curved so that a portion of the touch circuit member 435 faces an opposite surface to a surface of the display panel 410 that faces the touch panel 460.

A cover member 470 is disposed on the touch panel 460. Accordingly, the touch panel 460 is disposed between the cover member 470 and the display panel 410 or between the cover member 470 and the optical functional layer 420. According to an example embodiment, the cover member 470 may be omitted according to circumstances.

The cover member 470 prevents or substantially prevents damages due to an impact applied to the display panel 410 or the touch panel 460, thereby improving durability of the display panel 410. The cover member 470 may be formed of one or more of various suitable materials, for example, of a glass material or a plastic material. According to an example embodiment, when light generated within the display panel 410 is transmitted to the user's side through the cover member 470, the cover member 470 may be formed of a light-transmissive material.

According to an example embodiment, an adhesive material (not shown) may be disposed between the cover member 470 and the display panel 410.

Meanwhile, according to an example embodiment, a light blocking layer 471 may be formed in an area of the cover member 470 that is not covered by the touch panel 460.

The reinforcement member 440 is disposed on a surface of the display panel 410 facing the optical functional layer 420, that is, on an upper surface of the display panel 410. The reinforcement member 440 includes a first reinforcement member (or a first reinforcement) 441 and a second reinforcement member (or a second reinforcement) 442.

The display panel 410 includes a first area 410a that is not overlapped with the optical functional layer 420, the circuit member 430, and the touch circuit member 435. The first area 410a is an area including at least one edge of the display panel 410. The first reinforcement member 441 and the second reinforcement member 442 of the reinforcement member 440 are disposed in the first area 410a and at two sides with the circuit member 430 and the touch circuit member 435 included (or located) therebetween.

The display panel 410 includes first and second cutting portions CL1 and CL2 in at least two areas of an edge thereof. The first cutting portion CL1 and the second cutting portion CL2 are spaced apart from each other and may be formed at two sides with the circuit member 430 and the touch circuit member 435 included (or located) therebetween.

As described above, the display panel 410 may also include a substrate (not shown) and an encapsulation member (or an encapsulation, not shown), and the first cutting portion CL1 and the second cutting portion CL2 may be formed on the substrate. According to an example embodiment, the first cutting portion CL1 and the second cutting portion CL2 may be formed on the encapsulation member.

According to an example embodiment, the first cutting portion CL1 and the second cutting portion CL2 may overlap with a bending axis (not shown).

Also, according to an example embodiment, the first cutting portion CL1 and the second cutting portion CL2 are included in the first area 410a. That is, the first cutting portion CL1 and the second cutting portion CL2 may be formed in an area that is not overlapped with the optical functional layer 420, the circuit member 430, and the touch circuit member 435.

The first reinforcement member 441 and the second reinforcement member 442 of the reinforcement member 440 are disposed in the first area 410a and thus do not overlap with the circuit member 430 and the touch circuit member 435 and the optical functional layer 420.

According to an example embodiment, the reinforcement member 440 may be spaced apart from the optical functional layer 420 and the touch circuit member 435.

According to another example embodiment, the reinforcement member 440 may be formed to abut a side surface of the optical functional layer 420 or a side surface of the circuit member 430 or a side surface of the touch circuit member 435.

Also, the reinforcement member 440 may be disposed adjacent to the first and second cutting portions CL1 and CL2 as much as possible. That is, the first reinforcement member 441 may be disposed adjacent to the first cutting portion CL1, and according to an example embodiment, a width of the first reinforcement member 441 in at least a direction may correspond to a length of the first cutting portion CL1.

Also, the second reinforcement member 442 may be disposed adjacent to the second cutting portion CL2, and according to an example embodiment, a width of the second reinforcement member 442 in at least a direction may correspond to a length of the second cutting portion CL2.

According to an example embodiment, the first reinforcement member 441 may be formed to have a parallel edge to a boundary line of the first cutting portion CL1, and the second reinforcement member 442 may be formed to have a parallel edge to a boundary line of the second cutting portion CL2.

Meanwhile, the display apparatus 400 according to the present embodiment may have a planar shape or a bent (or curved) shape as illustrated in FIG. 10A and in FIG. 10B.

The reinforcement member 440 may be formed of one or more of various suitable materials, for example, an organic material. According to an example embodiment, the reinforcement member 440 may be formed of an organic material including an adhesive material.

According to an example embodiment, the reinforcement member 440 may be formed in the form of an adhesive tape and may be attached (e.g., easily attached) to the display panel 410.

According to an example embodiment, the reinforcement member 440 may include the same or substantially the same material as that of the display panel 410.

The reinforcement member 440 may have various thicknesses, and may have a thickness such that steps generated due to the optical functional layer 420 included in the display apparatus 400 may be compensated. For example, an extension line of an uppermost surface of the reinforcement member 440 may correspond to an extension line of an uppermost surface of the optical functional layer 420, such that the uppermost surfaces of the optical functional layer 420 and the reinforcement member 440 may be co-planar or substantially co-planar.

According to an example embodiment, the extension line of the uppermost surface of the reinforcement member 440 may be slightly below or slightly above the extension line of the uppermost surface of the optical functional layer 420, such that the uppermost surfaces of the optical functional layer 420 and the reinforcement member 440 may be close to being co-planar.

Although not illustrated, the display panel 410 in some embodiments may selectively include the structure of FIGS. 3 and 4 described above.

Figure 15:
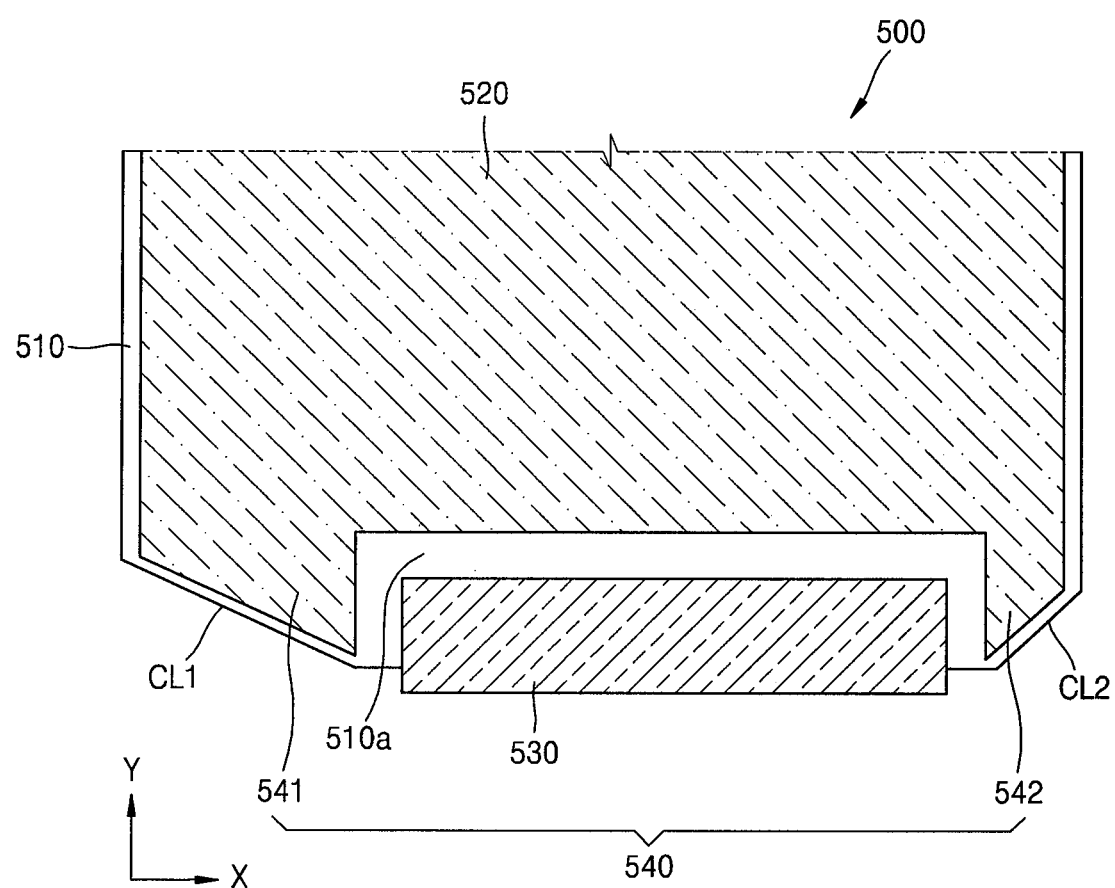
FIG. 15 is a schematic plan view illustrating an area of a display apparatus according to another embodiment of the present invention.

FIG. 15 is a schematic plan view illustrating an area of a display apparatus 500 according to another embodiment of the present invention.

Referring to FIG. 15, the display apparatus 500 includes a display panel 510, an optical functional layer 520, a reinforcement member 540, and a circuit member 530. Although not illustrated, according to an example embodiment, the display apparatus 500 may include a touch panel (not shown), and may further include a touch circuit member (not shown).

For convenience of description, description will focus on differences from the above-described embodiments.

Although not illustrated, according to an example embodiment, the display apparatus 500 may be bent with respect to a bending axis (not shown). Alternatively, the display apparatus 500 may be maintained in a bent state with respect to a bending axis (not shown). According to an example embodiment, the display apparatus 500 may be bent with respect to two bending axes (not shown), and may include cutting portions CL1 and CL2 that overlap with a bending axis (not shown).

The display panel 510 may include one or more display devices to form an image toward a user's side. For example, the display panel 510 may include a display device such as an organic light emitting device or a liquid crystal display device. The display panel 510 may also include one or more of other various suitable display devices.

The optical functional layer 520 is disposed to face a surface of the display panel 510, for example, an upper surface of the display panel 510. In detail, the optical functional layer 520 is disposed such that a visible ray generated within the display panel 510 passes through the optical functional layer 520. The optical functional layer 520 improves image quality characteristics of the display panel 510.

According to an example embodiment, the optical functional layer 520 may be a polarization layer. According to another example embodiment, the optical functional layer 520 may be a film-type polarization layer.

The circuit member 530 is formed to overlap with at least one edge of the display panel 510. The circuit member 530 may transmit an electrical signal used to operate the display panel 510, for example, to operate the display device of the display panel 510, to the display panel 510.

According to an example embodiment, an integrated circuit (IC) (not shown) that applies an electrical signal to the display panel 510 may be formed on a surface of the display panel 510, and the circuit member 530 may be disposed to be electrically connected to the IC. In this case, according to an example embodiment, an end of the circuit member 530 may be connected to a circuit board (not shown) to receive an electrical signal from the circuit board and transmit the electrical signal to the IC or receive an electrical signal from the IC and transmit the electrical signal to the circuit board.

According to an example embodiment, the circuit member 530 may include a flexible material. For example, the circuit member 530 may be an FPC. Alternatively, the circuit member 530 may be an FPCB.

The reinforcement member 540 is disposed on a surface of the display panel 510 facing the optical functional layer 520, that is, on an upper surface of the display panel 510. The reinforcement member 540 includes a first reinforcement member (or a first reinforcement) 541 and a second reinforcement member (or a second reinforcement) 542.

The first reinforcement member 541 and the second reinforcement member 542 are connected to the optical functional layer 520. According to an example embodiment, the first reinforcement member 541 and the second reinforcement member 542 may be formed of the same or substantially the same material as that of the optical functional layer 520, and according to an exemplary embodiment, the first reinforcement member 541 and the second reinforcement member 542 may be formed as a single body with the optical functional layer 520.

For example, when forming the optical functional layer 520, a pattern may be formed to extend to a first area 510a of the display panel 510 and to be disposed with the circuit member 530 included (or located) between the first reinforcement member 541 and the second reinforcement member 542, thereby forming (e.g., easily forming) the first reinforcement member 541 and the second reinforcement member 542.

The display panel 510 includes the first area 510a that does not overlap with the optical functional layer 520 and the circuit member 530. The first area 510a is an area including at least an edge of the display panel 510. The first reinforcement member 541 and the second reinforcement member 542 of the reinforcement member 540 are disposed in the first area 510a and at two sides with the circuit member 530 and a touch circuit member (or a touch circuit) 535 included (or located) therebetween.

The display panel 510 includes first and second cutting portions CL1 and CL2 in at least two areas of an edge thereof. The first cutting portion CL1 and the second cutting portion CL2 are spaced apart from each other and may be formed at two sides with the circuit member 520 included (or located) therebetween.

As described above, the display panel 510 may also include a substrate (not shown) and an encapsulation member (or an encapsulation, not shown), and the first cutting portion CL1 and the second cutting portion CL2 may be formed on the substrate. According to an example embodiment, the first cutting portion CL1 and the second cutting portion CL2 may be formed on the encapsulation member.

According to an example embodiment, the first cutting portion CL1 and the second cutting portion CL2 may overlap with a bending axis (not shown).

Also, according to an example embodiment, the first cutting portion CL1 and the second cutting portion CL2 are included in the first area 510a. That is, the first cutting portion CL1 and the second cutting portion CL2 may be formed in an area that is not overlapped with the optical functional layer 520 and the circuit member 530.

The first reinforcement member 541 and the second reinforcement member 542 of the reinforcement member 540 are disposed in the first area 510a and thus do not overlap with the circuit member 530 and the optical functional layer 520.

According to an example embodiment, the reinforcement member 540 may be spaced apart from the circuit member 530.

According to another example embodiment, the reinforcement member 540 may be formed to abut a side surface of the circuit member 530.

Also, the reinforcement member 540 may be disposed adjacent to the first and second cutting portions CL1 and CL2 as much as possible. That is, the first reinforcement member 541 may be disposed adjacent to the first cutting portion CL1, and according to an example embodiment, a width of the first reinforcement member 541 in at least a direction may correspond to a length of the first cutting portion CL1.

Also, the second reinforcement member 542 may be disposed adjacent to the second cutting portion CL2, and according to an example embodiment, a width of the second reinforcement member 542 in at least a direction may correspond to a length of the second cutting portion CL2.

According to an example embodiment, the first reinforcement member 541 may be formed to have a parallel edge to a boundary line of the first cutting portion CL1, and the second reinforcement member 542 may be formed to have a parallel edge to a boundary line of the second cutting portion CL2.

Meanwhile, the display apparatus 500 according to the present embodiment may have a planar shape or a bent (or curved) shape as illustrated in FIG. 10A and in FIG. 10B.

The reinforcement member 540 may be formed of one or more of various suitable materials, for example, an organic material. According to an example embodiment, the reinforcement member 540 may be formed of an organic material including an adhesive material.

According to an example embodiment, the reinforcement member 540 may be formed in the form of an adhesive tape and may be attached (e.g., easily attached) to the display panel 510.

According to an example embodiment, the reinforcement member 540 may include the same or substantially the same material as that of the display panel 510.

The reinforcement member 540 may have various thicknesses, and may have a thickness such that steps generated due to the optical functional layer 520 included in the display apparatus 500 may be compensated. For example, an extension line of an uppermost surface of the reinforcement member 540 may correspond to an extension line of an uppermost surface of the optical functional layer 520, such that the uppermost surfaces of the optical functional layer 520 and the reinforcement member 540 may be co-planar or substantially co-planar.

According to an example embodiment, the extension line of the uppermost surface of the reinforcement member 540 may be slightly below or slightly above the extension line of the uppermost surface of the optical functional layer 520, such that the uppermost surfaces of the optical functional layer 520 and the reinforcement member 540 may be close to being co-planar.

Although not illustrated, the display panel 510 in some embodiments may selectively include the structure of FIGS. 3 and 4 described above.

Also, although not illustrated, according to an example embodiment, the display apparatus 500 according to the present embodiment may include a touch panel (not shown) or a cover member (or a cover, not shown) as illustrated in FIG. 11.

The touch panel included in the display apparatus 500 has the same or substantially the same structure as that of FIGS. 6 and 7 described above.

Also, a structure including a touch circuit member (or a touch circuit, not shown) as illustrated in FIGS. 13 and 14 may be selectively applied.

According to the display apparatus 500 according to the present embodiment, the optical functional layer 520 and the reinforcement member 540 are connected so as to improve durability of the display panel 510 by using the reinforcement member 540. That is, as the reinforcement member 540 is connected to the optical functional layer 520, a pressure applied to the display panel 510 is reduced first via the reinforcement member 540, and then a pressure transmitted to the reinforcement member 540 may also be partially transmitted to the optical functional layer 520. Thus, generation or propagation of cracks due to abnormal concentration of stress on the display panel 510 may be reduced, substantially prevented, or prevented as described above.

In particular, according to an example embodiment, the reinforcement member 540 is formed as a single body with the optical functional layer 520 so that the reinforcement member 540 may be formed (e.g., easily formed) without any additional process except formation of the optical functional layer 520.

In addition, no gap is formed between the optical functional layer 520 and the reinforcement member 540. A gap might act as a path through which abnormal pressure may pass if an external force is applied to the display panel 510, and cracks may be suddenly generated due to the abnormal pressure. However, a structure according to the present embodiment in which the optical functional layer 520 and the reinforcement member 540 are formed as a single body may prevent (e.g., easily prevent) the above problem.

As described above, according to the one or more of the above embodiments of the present invention, durability of the display apparatus may be improved (e.g., easily improved).

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims, and their equivalents.

What is claimed is:

1. A display apparatus comprising:
   a display panel comprising a display device on a substrate, an encapsulation member, and a sealing member, the encapsulation member being on the sealing member and disposed over the display device;
   an optical functional layer disposed on the encapsulation member of the display panel;
   a circuit on a portion of the display panel on which the optical functional layer is not located;
   a reinforcement on the display panel without overlapping with the circuit, an overall thickness of the reinforcement being substantially equal to a combined thickness of the optical functional layer, the sealing member, and the encapsulation member, and the reinforcement comprising a same material as the optical functional layer; and
   a touch panel on the display panel,
   wherein the substrate has a cutting portion defining an outer edge of the substrate that forms an obtuse angle with each of two other edges of the substrate, and
   wherein the display apparatus is configured to maintain a curved shape with respect to a bending axis and includes a bending area with respect to the bending axis.

2. The display apparatus of claim 1, wherein the reinforcement is spaced apart from the circuit.

3. The display apparatus of claim 1, wherein a width of the reinforcement in at least a direction corresponds to a length of the cutting portion.

4. The display apparatus of claim 1, wherein the cutting portion is spaced apart from the circuit and the optical functional layer.

5. The display apparatus of claim 1, wherein the cutting portion defines corners at two sides of the display panel with the circuit located therebetween.

6. The display apparatus of claim 5, wherein the reinforcement comprises two portions that are respectively at the two sides of the display panel with the circuit located therebetween, so as to correspond to the cutting portion.

7. The display apparatus of claim 1, wherein the cutting portion is in the bending area.

8. The display apparatus of claim 1, further comprising a touch circuit configured to transmit an electrical signal to the touch panel,
   wherein the reinforcement does not overlap with the touch circuit.

9. The display apparatus of claim 1, further comprising a cover on the display panel,
   wherein the reinforcement is between the display panel and the cover.

10. The display apparatus of claim 1, wherein the optical functional layer comprises a polarization layer.

11. The display apparatus of claim 1, wherein the reinforcement comprises an organic material.

12. The display apparatus of claim 1, wherein the reinforcement comprises an adhesive material.

13. The display apparatus of claim 1, wherein the reinforcement comprises an adhesive tape.

14. The display apparatus of claim 1, wherein the encapsulation member is on the substrate, and fixed to the substrate by the sealing member,
   wherein the display device is between the substrate and the encapsulation member, and
   wherein the reinforcement is on the substrate.

15. The display apparatus of claim 1, wherein the reinforcement comprises a same material as that of the substrate.

16. The display apparatus of claim 1, wherein the substrate comprises a plastic material.

17. The display apparatus of claim 1, wherein the substrate comprises a polyethylene terephthalate (PET).

18. A display apparatus comprising:
   a display panel comprising a display device, an encapsulation member, and a sealing member, the encapsulation member being on the sealing member and disposed over the display device;
   an optical functional layer on a surface of the display panel, and on the encapsulation member;
   a circuit on the surface of the display panel on which the optical functional layer is located;
   a cover on the optical functional layer;
   a reinforcement on the display panel without overlapping with the circuit, an overall thickness of the reinforcement being substantially equal to a combined thickness of the optical functional layer, the sealing member, and the encapsulation member, the reinforcement comprising a same material as the optical functional layer;
   a cutting portion defining an outer edge of the display panel, the outer edge joining two other edges of the display panel, and forming an obtuse angle with each of the two other edges; and
   a touch panel on the display panel,
   wherein a region of a side of the reinforcement faces the cutting portion, and
   wherein the reinforcement is located in an area surrounded by the cutting portion, the circuit, and the optical functional layer,
   wherein the touch panel covers the optical functional layer and the reinforcement,
   wherein the reinforcement is between the display panel and the touch panel,
   wherein the display apparatus is formed to maintain a curved shape with respect to a bending axis and includes a bending area with respect to the bending axis, and
   wherein the cutting portion is formed in a bending region to overlap with the bending axis, and
   wherein the reinforcement is formed in the bending region to overlap with the bending axis.

19. The display apparatus of claim 18, wherein the reinforcement is overlapped by the cover.

* * * * *